United States Patent
Buck et al.

(10) Patent No.: US 12,073,676 B2
(45) Date of Patent: Aug. 27, 2024

(54) PERSONAL IDENTITY VERIFICATION SYSTEM AND METHOD FOR VERIFYING THE IDENTITY OF AN INDIVIDUAL

(71) Applicant: LEGIC Identsystems AG, Wetzikon (CH)

(72) Inventors: Martin Buck, Zug (CH); Marcel Plüss, Tann (CH)

(73) Assignee: LEGIC IDENTSYSTEMS AG (CH)

(*) Notice: Subject to any disclaimer, the term of this patent is extended or adjusted under 35 U.S.C. 154(b) by 378 days.

(21) Appl. No.: 17/696,025

(22) Filed: Mar. 16, 2022

(65) Prior Publication Data
US 2022/0207947 A1    Jun. 30, 2022

Related U.S. Application Data

(63) Continuation-in-part of application No. 16/132,534, filed on Sep. 17, 2018, now Pat. No. 11,314,977.

(30) Foreign Application Priority Data

Sep. 18, 2017 (CH) ...................................... 1150/17

(51) Int. Cl.
*G07C 9/37* (2020.01)
*G06V 10/74* (2022.01)
*G06V 40/16* (2022.01)

(52) U.S. Cl.
CPC ............. *G07C 9/37* (2020.01); *G06V 10/761* (2022.01); *G06V 40/172* (2022.01)

(58) Field of Classification Search
CPC ........ G07C 9/37; G07C 9/257; G06V 10/761; G06V 40/172
See application file for complete search history.

(56) References Cited

U.S. PATENT DOCUMENTS 10,311,288 B1 *  6/2019  Dandekar .............. G06F 16/583
10,579,783 B1 *  3/2020  Aument ................. G06V 40/40
(Continued)

FOREIGN PATENT DOCUMENTS

EP    3457365 B1    9/2023

OTHER PUBLICATIONS

Search Report mailed Jan. 15, 2018 in corresponding Swiss Patent Application No. 01150/17.
(Continued)

*Primary Examiner* — Dhaval V Patel
(74) *Attorney, Agent, or Firm* — OSTROLENK FABER LLP (57) ABSTRACT

A Personal Identity Verification System for verifying the identity of an individual (600) carrying a wireless mobile communications device (400) is proposed, comprising image data of an area of the individual's body, said image data being stored in the wireless mobile communications device (400), at least one image capture device (100) configured to capture visual data of an area of the individual's body and at least one wireless communications module (200) configured to receive the image data from the wireless mobile communications device (400). Further, an electronic circuit (300) is provided that is configured to compare the visual data with the image data and to generate positive verification information when the visual data and the image data are established to be similar within a similarity-tolerance.

20 Claims, 3 Drawing Sheets

(56) References Cited

U.S. PATENT DOCUMENTS

| | | |
|---|---|---|
| 11,314,977 B2 | 4/2022 | Buck et al. |
| 2006/0028556 A1 | 2/2006 | Bunn |
| 2012/0200390 A1 | 8/2012 | Saravanan |
| 2015/0281232 A1 | 10/2015 | Gormley et al. |
| 2016/0063235 A1 | 3/2016 | Tussy |
| 2016/0086019 A1* | 3/2016 | Ganong ............... G06Q 30/02 382/118 |
| 2017/0124394 A1* | 5/2017 | Thavalengal ........ H04N 23/843 |
| 2022/0207947 A1 | 6/2022 | Buck et al. |

OTHER PUBLICATIONS

Office Action dated Mar. 12, 2024 issued in corresponding Canadian Patent Application No. 3,017,324.

* cited by examiner

PERSONAL IDENTITY VERIFICATION SYSTEM AND METHOD FOR VERIFYING THE IDENTITY OF AN INDIVIDUAL

CROSS-REFERENCE TO RELATED APPLICATIONS

This application is a continuation-in-part of U.S. patent application Ser. No. 16/132,534, filed Sep. 17, 2018, the contents of which are incorporated by reference herein.

FIELD OF THE INVENTION

The present invention relates to a personal identity verification system, in particular to a personal identity verification system for verifying the identity of an individual subject to a security check.

BACKGROUND OF THE INVENTION

As computer processing power increases and is projected by the semiconductor industry to continue increasing at the same rate at least for the next few decades, images captured by cameras can be processed at ever increasing rates. Although greater processing power enables more complex image processing programs to be executed in real time by machine vision systems, notably in the automotive industry for manufacturing and for autonomous driving applications, the features to be recognized are largely constant, such as automobile parts and hazards on the road. Identification can be carried out by scanning pre-defined visual markers such as codes on objects.

Because the flux of people at public transportation hubs or places of public gathering such as event venues is increasing with improved mobility and economic means, automated personal identification and verification system have become more common for border control and security reasons. However, the number of people who can be verified by these systems in any given time frame is limited by the physical act of having to present a passport or other form of identification for scanning.

SUMMARY OF THE INVENTION

An object underlying the invention disclosed in the present document is to create a fast and accurate personal identity verification system. In particular, it is an object of the present invention to provide a personal identity verification system with a high degree of autonomy, wherein, in order to perform the verification, minimal or no action is required by a verifying party or by an individual subject to the identity verification.

These objects are achieved by the invention according to the independent claims. Advantageous embodiments of the present invention are described in the description of this document and covered by the dependent claims.

According to the present invention, a system for verifying the identity of an individual carrying a wireless mobile communications device, henceforth termed "individual's mobile device" in the description of this document, comprises image data of an area of the individual's body, said image data being stored in the individual's mobile device. The system further comprises at least one image capture device configured to capture visual data of an area of the individual's body. The system further comprises at least one wireless communications module, henceforth termed "authority's wireless communications module" in the description of this document, the authority's wireless communications module being configured to receive the image data from the individual's mobile device. The system further includes an electronic circuit configured to compare the visual data with the image data and to generate positive verification information when the image data and the visual data are established to be similar within a similarity-tolerance. The authority's wireless communications module and the electronic circuit are preferably operated by the official identity verification authority tasked with verifying the identities of individuals at an identity verification site. The term "carrying" includes the situation where another person temporarily holds or uses the individual's mobile device, such as when taking a picture of the individual. For verifying that the individual is indeed at the personal identity verification system, e.g. within a defined perimeter or area around the personal identity verification system or the at least one wireless communications module arranged at the identity verification site, the electronic circuit is further configured to determine the distance between the mobile communications device carried by the individual and the at least one wireless communications module arranged at the identity verification site. The electronic circuit generates the positive verification information when the image data and the visual data are established to be similar within the similarity-tolerance and the distance between the mobile communications device carried by the individual and the at least one wireless communications module arranged at the identity verification site is smaller than a predefined value.

In an embodiment, the at least one wireless communications module arranged at the identity verification site comprises an ultra-wideband (UWB) communications module, and the electronic circuit is configured to determine the distance between the mobile communications device carried by the individual and the at least one wireless communications module arranged at the identity verification site based on transmission properties of an ultra-wideband transmission between the mobile communications device carried by the individual and the at least one wireless communications module arranged at the identity verification site.

In an embodiment, the electronic circuit is configured to determine the distance between the mobile communications device carried by the individual and the at least one wireless communications module arranged at the identity verification site using transmission properties including at least one of: a time difference, an amplitude difference, or a phase difference of the ultra-wideband transmission.

In an embodiment, the electronic circuit is configured to compare the distance between the mobile communications device carried by the individual and the at least one wireless communications module arranged at the identity verification site to the predefined value indicative of a defined perimeter or area around the at least one wireless communications module arranged at the identity verification site.

In an embodiment, the at least one wireless communications module arranged at the identity verification site comprises an ultra-wideband communications module configured to receive the image data from the wireless mobile communications device via ultra-wideband transmission.

The personal identity verification system according to the invention has the advantage that an individual subject to the identity verification does not need to carry an identification card dedicated to the purpose of personal identity verification. It is sufficient that the image data of the individual is stored in the individual's mobile device. Another advantage is that the personal identity verification system does not require the individual undergoing the identity verification to hand over or present any additional object or device so that it can be read, scanned and/or registered. This speeds up the identity verification process, particularly when a larger number of individuals are subject to the identity verification. Where an individual chooses not to undergo the personal identity verification by the system according to the invention, he or she can undergo a known manual identity verification by an authority checking an individual's identification against the information in the authority's database. Advantageously, therefore, the personal identity verification system according to the invention may be provided alongside and upgrade existing manual personal identity verification systems.

In an embodiment, the image data is trusted image data registered by an official registering authority. This has the advantage of a limited variance in the types of possible image data that are subject to the comparison with the visual data obtained by the image capture device, thereby allowing the electronic circuit to have a leaner configuration for comparing the visual data with the image data.

In an embodiment, the wireless mobile communications device carried by the individual is one out of the group: pocket Wi-Fi, mobile telephone, smartphone, satellite phone, smartwatch, wearable, tablet PC or laptop computer. The ubiquity of such devices enables the personal identity verification system according to the invention to be advantageously implemented for a large number of individuals.

In an embodiment, the at least one authority's wireless communications module is configured to transmit a wireless signal to the individual's mobile device. This has the advantage of enabling a wireless data exchange between the at least one authority's communications module and the individual's mobile device, including wireless pairing operations. In an embodiment, the at least one authority's wireless communications module and the individual's mobile device establish a WSAN (Wireless Sensor Area Network) or a WLAN (Wireless Local Area Network).

In an embodiment, the authority's wireless communications module comprises at least one antenna for receiving wireless signals. This antenna may be directional. In another embodiment, the authority's wireless communications module comprises multiple antennas. In a further embodiment, the authority's wireless communications comprises multiple directional antennas. An authority's wireless communications device with at least one, preferably multiple, more particularly 3 directional antennas is configured to detect different wireless signals strengths from an individual's mobile device from different directions, which data is then relayed to the electronic circuit for evaluation of the position or localisation of the individual's mobile device, for example by means of triangulation or an RSSI (Received Signal Strength Indicator) calculations.

In an embodiment, the authority's wireless communications module comprises at least one loop antenna configured to employ electromagnetic induction between itself and the individual's mobile device for receiving wireless signals from the individual's mobile device via NFC ((Near Field Communication).

In an embodiment, the at least one authority's wireless communications module and the individual's wireless mobile communications device are configured to exchange wireless data based on a wireless data exchange protocol standard including at least one of: ultra-wideband (UWB) communication, Wi-Fi, WirelessHD, WiGig, Bluetooth, Bluetooth 4.0 and/or BLE (Bluetooth Low Energy), or NFC.

In an embodiment, the visual data and the image data both comprise digital images. The visual data preferably includes an area of the individual's body also contained in the image data, preferably the whole area of the individual's body that is contained in the image data.

In an embodiment, the electronic circuit is configured to employ an image-similarity metric to establish the similarity between the visual data and the image data. In an embodiment, the electronic circuit is configured to perform an operation on the differences between corresponding pixels in the digital image contained in the visual data and the digital image contained in the image data carried by the individual, wherein a summation is performed over the modified differences.

In an embodiment, the electronic circuit is configured to execute an image-similarity metric including at least one out of the group: distance functions, L1 metric, L2 metric, statistical classifiers. The L1 metric, also known as the SAE (Sum of Absolute Error) metric, lacking product calculations, requires less computational resources. The L2 metric is also known as the Least Square Regression and is advantageous for being differentiable for all deviations between the visual data and the image data.

In an embodiment, a combination of the L1 and/or L2 metrics and a statistical classifier is employed by the electronic circuit to determine whether or not the similarity between the visual data and the image data falls within the similarity-tolerance.

In an embodiment, the electronic circuit is configured to generate negative verification information when a similarity between the visual data and the image data cannot be established within said similarity-tolerance.

In an embodiment, the at least one image capture device, such as a camera, is mounted at the personal identity verification system, e.g. operated by the official identity verification authority tasked with verifying the identities of individuals.

In an embodiment, the electronic circuit comprises a microprocessor configured to execute a computer program and at least one computer memory device in which the computer program along with the visual data and the image data are stored. The electronic circuit also comprises at least one system bus configured to communicatively connect the microprocessor, the at least one computer memory device and the at least one authority's wireless communications module to each other.

In an embodiment where the at least one image capture device is operated by the official identity verification authority, the electronic circuit comprises at least one system bus configured to communicatively connect the microprocessor, the at least one computer memory device, the at least one image capture device operated by the official identity verification authority, and the at least one authority's wireless communications module to each other. Alternatively, the at least one image capture device operated by the official identity verification authority is wirelessly connected to the electronic circuit, for example via the authority's wireless communications module.

In an embodiment, the at least one image capture device is a part of the individual's mobile device, such as an integrated camera. Preferably, the individual's mobile device is configured to wirelessly transmit visual data captured by the image capture device to the authority's wireless communications module, whereby the configuration is one of transmitting the visual data simultaneously, before or after the image data is transmitted to the authority's wireless communications module. Thus, the personal identity verification system for verifying the identity of an individual carrying a wireless mobile communications device, comprises: at least one wireless communications module configured to receive from the wireless mobile communications device image data of an area of the individual's body, said image data being stored in the wireless mobile communications device, and to receive from the wireless mobile communications device visual data of an area of the individual's body, said visual data being captured by an image capture device which is a part of the wireless mobile communications device carried by the individual; and an electronic circuit configured to compare the image data with the visual data, and to generate positive verification information when the image data and the visual data are established to be similar within a similarity-tolerance. The personal identity verification system makes it possible to verify the identity of an individual by comparing image data (previously) stored in the wireless mobile communications device of the individual with visual data captured by the image capture device of the wireless mobile communications device at the time of the verification, such that the personal identity verification system does not need to be equipped with an image capture device.

In an embodiment, the image capture device is operated by an official identity verification authority and another image capture device such as a camera is a part of the wireless mobile communications device carried by the individual. The authority's wireless communications module is configured to receive visual data captured by and sent from both the authority's image capture device and the image capture device integrated into the individual's mobile device. In the event the individual's mobile device cannot capture visual data of an area of the individual's body or cannot capture the visual data in sufficiently high quality or if there is a doubt as to the authenticity of the visual data captured by the individual's mobile device, the image capture device operated by the authority can act as a backup.

In an embodiment, the at least one image capture device is a trusted image capture device operable after unlocking with a password, a swipe pattern, an electronic signature and/or a fingerprint scan. Risk of tampering with the image capture device and compromising the identity verification can thus be reduced.

In an embodiment of the personal identity verification system, a gate is communicatively connected to the electronic circuit wherein, if the electronic circuit generates positive verification information, the gate is configured to open and let the individual through. In embodiment, if the electronic circuit generates negative verification information, the gate is configured to remain closed. Preferably, if the electronic circuit generates negative verification information, an acoustic or optical signal is generated informing the individual and the verifying authority of passage denial.

In an embodiment, the personal identity verification system comprises multiple image capture devices and authority's wireless communications modules connected to the electronic circuit. Alternatively, the personal identity verification system comprises multiple image capture devices and authority's wireless communications modules that are each connected to a dedicated electronic circuit such as one disclosed in this document.

In an aspect, the present invention is directed to a method for verifying the identity of an individual carrying a wireless mobile communications device, including capturing visual data of an area of the individual's body and receiving in an electronic circuit, from the wireless mobile communications device via a wireless communications module, image data of an area of the individual's body, said image data being stored in the wireless mobile communications device. The method further includes comparing the image data with the visual data and generating positive verification information when the image data and the visual data are similar within a similarity-tolerance. The term "carrying" includes the situation where another person temporarily holds or uses the individual's mobile device, such as when taking a picture of the individual. For verifying that the individual is indeed at the personal identity verification system, e.g. within a defined perimeter or area around the personal identity verification system or the at least one wireless communications module arranged at the identity verification site, the method further comprises the electronic circuit determining the distance between the mobile communications device carried by the individual and the at least one wireless communications module arranged at the identity verification site. The method comprises the electronic circuit generating the positive verification information when the image data and the visual data are established to be similar within the similarity-tolerance and the distance between the mobile communications device carried by the individual and the at least one wireless communications module arranged at the identity verification site is smaller than a predefined value, e.g. indicative of a defined perimeter or area around the personal identity verification system or the at least one wireless communications module arranged at the identity verification site.

An embodiment of the method includes transmitting the image data from the wireless mobile communications device via a wireless data exchange protocol chosen out of the group: ultra-wideband communication, Wi-Fi, WirelessHD, WiGig, Bluetooth, Bluetooth 4.0, BLE, or NFC.

In an embodiment, capturing visual data of an area of the individual's body is carried out with the use of an image capturing device, such as a camera, mounted at the personal identity verification system, e.g. operated by an official identity verification authority.

In an embodiment, capturing visual data of an area of the individual's body is carried out with the use of the individual's mobile device, for example by means of a camera integrated into the individual's mobile device. A further embodiment includes transmitting the visual data captured by the integrated camera simultaneously, before or after the image data is transmitted to the authority's wireless communications module. Thus, the method of verifying the identity of an individual carrying a wireless mobile communications device comprises: capturing visual data of an area of the individual's body, using a camera integrated into the wireless mobile communications device of the individual; receiving in an electronic circuit of a personal identity verification system, from the wireless mobile communications device, using a wireless communications module of the personal identity verification system, image data of an area of the individual's body, said image data being stored in the wireless mobile communications device, and the visual data captured by the camera integrated into the wireless mobile communications device of the individual; comparing by the electronic circuit the image data with the visual data; and generating by the electronic circuit positive verification information when the image data and the visual data are similar within a similarity-tolerance.

In an embodiment, capturing visual data of an area of the individual's body is carried out both by the authority's image capture device and a camera integrated into the individual's mobile device, whereby the authority's image capture device acts as a backup in the event the camera of the individual's mobile device fails to capture the visual data or capture it in sufficiently high quality or if there is a doubt as to the authenticity of the visual data captured by the individual's mobile device.

In an embodiment, the method includes comparing the image data with the visual data if the image data is trusted image data registered by an official registering authority.

In an embodiment of the method, both the image data and the visual data are stored in at least one computer memory device.

BRIEF DESCRIPTION OF THE DRAWINGS

The present invention will be explained in more detail, by way of example, with reference to the drawings in which.

DESCRIPTION OF THE EMBODIMENTS

Figure 1:
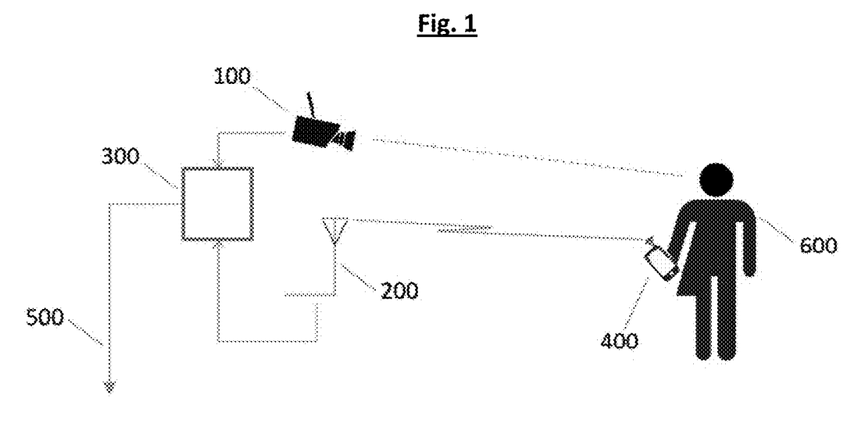
FIG. 1 is a schematic representation of the personal identity verification system as realized at an identity verification site, wherein an image capture device is operated by the official identity verification authority.

One configuration of the personal identity verification system is shown in FIG. 1. An authority's image capture device 100 is set up in an area where the personal identity of an individual 600 is to be verified, such as in an immigration hall at an airport, at the entrance to a public events venue or in the entrance hall of an office building. In an airport immigration hall, the authority's image capture device may be set up in an immigration control lane, for example next to existing manual immigration control lanes. The authority's image capture device 100 is configured to capture visual data, in particular a digital image of an area of the individual's body, preferably the individual's face. To improve robustness, multiple digital images can be taken in succession of the individual's face and a highest quality image selected for comparison with the trusted image data received from the individual. To ensure that the image of the individual's face is consistently taken from the same perspective, in particular from the horizontal, the authority's image capture device 100 can be mounted on a lift which adjusts the elevation of the image capture device to the vertical position of the individual's face. Information relating to the individual's height may be captured by another authority's image capture device or height sensor, be relayed to the electronic circuit 300 described in further detail below and control the lift-positioning. To ensure consistent placement of the individual's face for the image capture, the surface of the floor at the site of identity verification may be marked with a visual indicator directing the individual where to stand to have his or her image taken.

An authority's image capture device 100 suitable for the identification verification system described in this document includes any such device configured to capture the light emitted, reflected and/or scattered by an object, in particular by an area of the human body such as the human face. The captured light includes the part of the electromagnetic spectrum discernible to the human eye and brain. Hence, the authority's image capture device is configured to capture visual data of an area of the individual's body, such as the face. The image capture device 100 preferably comprises an image sensor converting the light incident on the sensor into electrical signals, such as a CMOS or a CCD. Further, the authority's image capture device 100 preferably comprises at least one computer memory device for storing the visual data and/or any of a lens, a shutter, a filter, a user-interface such as an electronic display. Suitable examples of an authority's image capture device 100 are a digital camera or a CCD-camera.

For convenience, the authority's image capture device 200 may be built into a wireless mobile communications device such as a smartphone, laptop computer or tablet PC. The authority's wireless mobile communications device is preferably unlockable with a security code.

Generally, the electronic circuit 300 may be located at the identity verification site or at a distance therefrom, for example at a secure location such as a server room or an office room to which cleared personnel have access.

At least one authority's wireless communication's module 200 is arranged at the identity verification site and may be mounted at the same location as the image capture device 100 or at another location convenient for connecting the module to the electronic circuit 300. The authority's wireless communications module 200 is configured to receive and relay image data sent from the individual's mobile device 400. To further increase security of the system, the authority's wireless communications module 200 is configured to receive additional ID data or authentication data from the individual 600 via the mobile device 400.

The authority's wireless communications module 200 is a wireless data receiver configured to receive wireless radio signals, in particular BLE compatible Bluetooth signals or NFC signals. However, the authority's wireless communication's module 200 alternatively is a wireless data receiver and transmitter configured to receive and transmit said wireless radio signals. In an embodiment, the wireless data receiver of the authority's wireless communications module 200 comprises an ultra-wideband (UWB) communications module, e.g. an ultra-wideband transceiver configured to receive and transmit data via ultra-wideband transmission.

The authority's wireless communications module 200 preferably comprises an input/output terminal for receiving (inputting) and transmitting a wireless signal to the individual's mobile device 400 and for outputting a wireless signal received from the individual's mobile device to the electronic circuit 300. The wireless communications module 200 comprises an antenna, in particular a PCB (Printed Circuit Board) antenna or a chip antenna to which the input/output terminal of the wireless communications module be connected.

Figure 4:
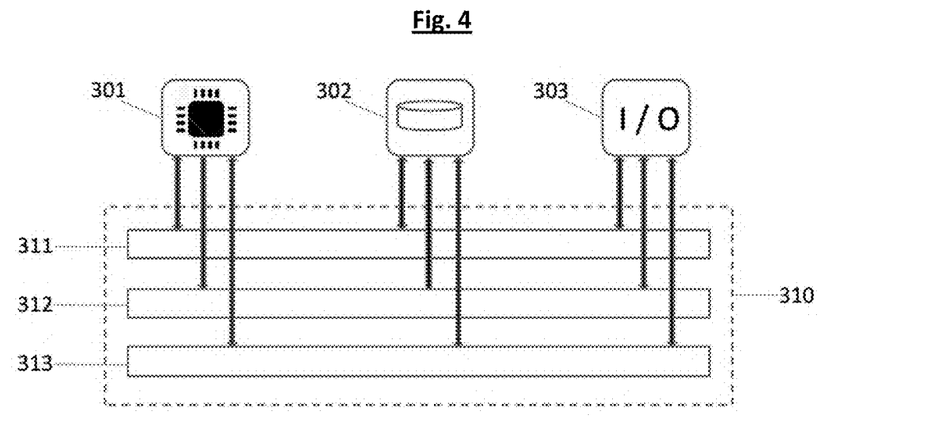
FIG. 4 is a schematic representation of the electronic circuit included in personal identity verification system.

The authority's wireless communications module 200 may include multiple, at least 3 directional antennas that detect different wireless signal strengths from an individual's mobile device and accurately determine its location (localisation) by means of RSSI or triangulation, the calculation so of which is performed by the microprocessor 301 of the electronic circuit 300 (see FIG. 4).

Alternatively, wireless communications module 200 comprises a transceiver, wherein a single antenna is suitable both for receiving and for transmitting wireless signals. In embodiments where the wireless communications module 200 is configured to receive and transmit wireless signals of different frequency ranges, the wireless communications module 200 comprises a plurality of antennas dedicated to the respective frequency range. Alternatively or additionally, the antenna is or antennas are coupled to a frequency divider for separating wireless signals of a certain frequency range from wireless signals of another frequency range.

A wireless communications module 200 suitable for the purposes of the present invention is a router, for example a single-band or a multi-band router. The multi-band router may be of a selectable or simultaneous type allowing selection of the frequency band to be used or allowing simultaneous use of different frequency bands.

Suitable wireless signals received and transmitted by the wireless communications module 200 and by the individual's mobile device 400 are chosen out of the group ultra-wideband (UWB), Bluetooth, Bluetooth with BLE, Wi-fi, WirelessHD and WiGig, NFC. The wireless signals may have frequencies of 13.56 MHz (NFC), 2.41 to 2.49 GHz, 3.65 to 3.70 GHz, 4.94 to 5 GHz or 5.15 to 5.73 GHz, depending on the wireless protocol used and the preferred or allowed channel in the area where the identity verification takes place. Employing frequency ranges outside of the 2.4 GHz band has the advantage that these are less likely to be congested.

The individual's mobile communication device 400 is shown to be carried in the hand of the individual 600 but it may instead be kept in a pocket or other storage space on the individual such as bag. The individual's mobile device 400 is configured to store the image data of an area of the individual's body such as the face and transmit it to the wireless communications module 200, whereby the image data preferably is trusted image data registered by an official registering authority. To further increase security of the system, the individual's mobile device 400 is configured to store additional ID data or authentication data of the individual 600 and send it, preferably wirelessly, to the authority's wireless communications module 200. Examples of such additional ID or authentication data are fingerprint scans, voice patterns or electronic keys. For example, the individual's mobile device 400 comprises a wireless communications module configured to receive, generate, transmit and process wireless signals to and from the authority's wireless communications module. It is preferably configured to establish a wireless data exchange link with the authority's wireless communications module 200 according to the master and slave principle wherein the individual's mobile device is the slave unit and wireless communications module 200 is the master unit. In an aspect, to avoid interference, the master unit and slave unit employ a common frequency hopping technique when sending and receiving wireless signals to and from one another, such as FHSS. To establish the wireless data exchange link for the first time, the individual's mobile device 400 in particular its wireless communications module preferably prompts the individual 600 for permission to establish the wireless data exchange link with the authority's wireless communications module 200.

Thereafter, the wireless data exchange link may be established, preferably automatically, when the individual's mobile device 400 is in the range of the authority's wireless communication module 200. The image data stored in the individual's mobile device may then, when the latter has detected a wireless signal from the authority's wireless communications module 200 such as a paging or "search" signal, be automatically sent to the authority's wireless communication module 200, in particular to the electronic circuit 300 for comparison with the "live" visual data of the individual captured by the image capture device 100.

The wireless communications module of the individual's mobile device 400 may comprise any or all of the hardware components PCB, a transceiver to receive and generate and transmit a wireless signal, an antenna such as a PCB trace antenna, a T/R (Transmit/Receive) switch, a power management unit, matching components for antenna impedance matching, in particular an LC circuit, a ground line or ground plane, a microprocessor (CPU) and computer memory device such as RAM, DRAM, SRAM, Flash, EEPROMS for storing the image data of the individual and any computer programs run on the individual's mobile device. Any combination of these hardware components may be realized as an IC (Integrated Circuit) on a common substrate such as a PCB.

A suitable example of the individual's mobile device 400 is a mobile phone such as a smartphone running on any of the operating systems Android, iOS, a Linux distribution, Blackberry or Windows Phone. Preferably, the individual's mobile communication device comprises an integrated wireless communications module such as a Bluetooth module that implements BLE or an NFC module. However, an external Bluetooth and/or BLE module/NFC module may alternatively be connected to the individual's mobile device, for example via a USB (Universal Serial Bus) link. Instead of a smartphone, the individual's mobile device may be a pocket Wi-fi (also known as a WLAN Hotspot Router), a satellite phone, a smartwatch, a wearable, a tablet PC or a laptop computer. Any of these device may the run by any of the aforementioned operating systems, in particular comprise apps for running the wireless communication, for example an app for the Bluetooth or NFC communication. In an embodiment, the wireless data receiver of the individual's mobile device 400 comprises an ultra-wideband (UWB) communications module, e.g. an ultra-wideband transceiver configured to receive and transmit data via ultra-wideband transmission.

The personal identity verification system comprises, in an embodiment, a gate (not shown) communicatively connected to the electronic circuit 300 described in greater detail below wherein the gate is configured to open and let the individual undergoing the identity verification pass through if the electronic circuit generates positive verification information. The authority's image capture device 100 and any sensor determining the height of the individual is preferably located next to the gate.

Figure 2:
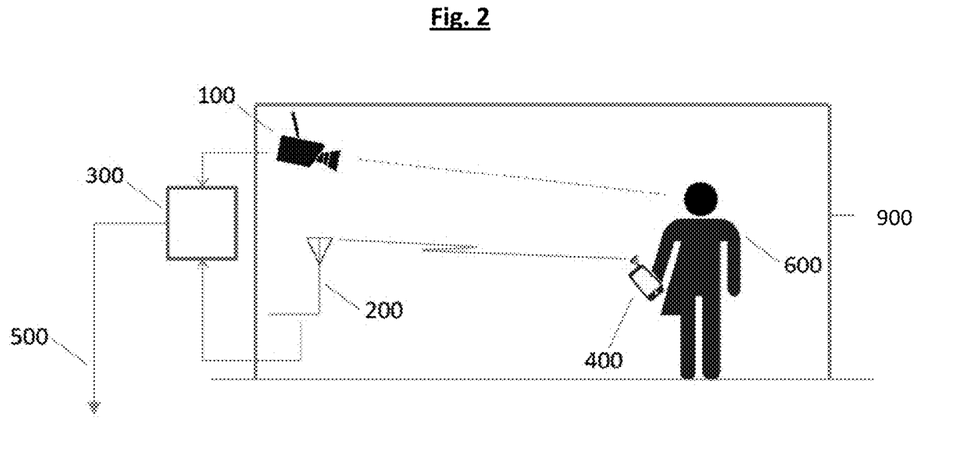
FIG. 2 is a schematic representation of the personal identity verification system including an enclosure at an identity verification site security check.

In the embodiment according to FIG. 2, the personal identity verification system according to FIG. 1 additionally includes a shield enclosure 900 comprising barriers opaque or largely opaque to wireless signals transmitted from the individual's mobile device 400, and, where applicable, to the wireless signal transmitted from the authority's communications module 200.

The image capture device is arranged in the shield enclosure 900 suitably for capturing visual data of the individual in the shield enclosure. The shield enclosure 900 is set up at the site of identity verification and permits entry of one individual 600 undergoing the identity verification at a time. Wireless signals from other individual's mobile devices and/or other authority's mobile communication modules outside of the enclosure do not effectively penetrate the shield enclosure 900. Image data transmitted from the individual's mobile device 400 located in the enclosure to the authority's wireless communications module 200 is unambiguously allocated to the "live" visual data captured by the image capture device 100 and these are compared, by means of the electronic circuit 300, to determine whether or not they are similar within a similarity tolerance. Preferably, the barriers constituting the enclosure are opaque to radio frequencies, preferably at or above 2.4 GHz, more preferably above 300 MHz. Suitable opaque barrier material for attenuating, absorbing and/or reflecting wireless signals include metals, hence the barriers may be covered or coated with metal such as aluminium, steel or copper. Other suitable material include concrete and/or ceramic.

Figure 3:
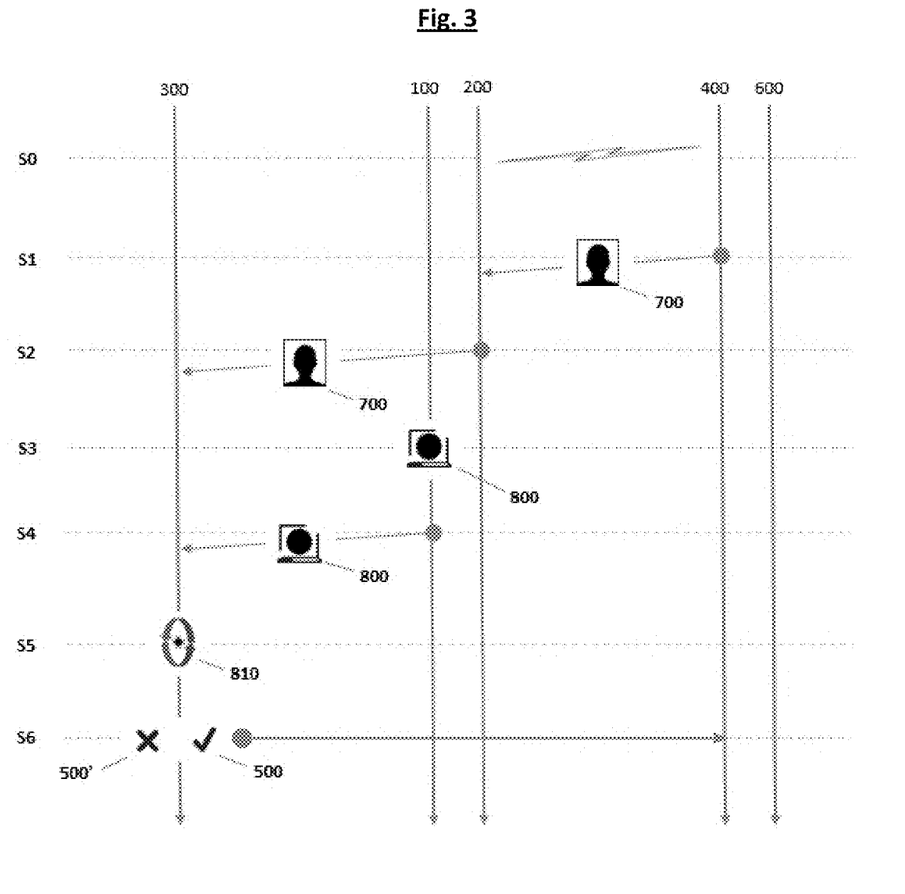
FIG. 3 shows a series of steps performed in embodiments of the identity verification system wherein the visual data of an area of the individual's body is captured by an image capture device operated by the official identity verification authority.

In step S0 according to FIG. 3, the individual's mobile device 400 is paired for wireless data exchange via a wireless data exchange protocol such as Wi-Fi or Bluetooth, in particular Bluetooth with BLE, or NFC, with the authority's wireless communications module 200. To do this, the authority's wireless communications module 200 transmits a wireless beacon such as a Wi-Fi or Bluetooth beacon recognizable by the wireless communications module of individual's mobile device 400. A computer program is preferably installed on the individual's mobile device 400 that, upon recognition of the beacon, instructs the individual's mobile device to automatically transmit a wireless signal comprising the image data 700 in step S1. This wireless signal is then received at the mobile communications module 200. For example, the computer program is configured to, when compiled and executed, i) initiate transmission of the image data 700 stored in the individual's mobile device to the authority's wireless communications module 200, ii) prompt the individual 600 carrying the mobile device to allow or decline transmission of the image data 700 from the individual's mobile device 400 to the authority's wireless communications module 200, iii) encode the image data 700 into a wireless signal, and/or iv) compress the image data 700.

Preferably, the computer program includes a wireless protocol stack to enable the individual's mobile device 400 in particular its wireless communications module and the authority's wireless communications module 200 to agree on how data is wirelessly exchanged and to carry out the data exchange. The computer program may be embedded and/or firmware. Transmission, preferably automatic transmission of the image data 700 from the individual's mobile device 400 to the wireless communications module 200 may depend on a data exchange link having been previously established between the wireless communications module 200 and the individual's mobile device 400. Alternatively, a beacon sent out from the authority's wireless communications module 200, upon recognition by the individual's mobile device 400, triggers a prompt on the individual's mobile device for transmitting a wireless signal including the image data 700.

Where NFC is used for transmitting and receiving the wireless data, a beacon may not be required to be sent out from the authority's wireless communications module 200. Instead, the individual places the mobile device 400 on or very close to the wireless communications module 200, thereby enabling transmission of the wireless data comprising the image data and additional ID or authentication data where desired.

Suitable image data includes data relating to the structure of an area of the individual carrying the mobile device. For example, the image data 700 includes a digital image of the individual's face, open eye or iris. Image data 700 encoded, compressed, encrypted and/or modified into a mathematical algorithm is also suitable. For example, the image data 700 encoding is configured to reduce the image file size and allow faster comparison with the visual data. Preferably, the image data 700 is configured by the registering authority to prevent tampering following its creation. To that end, the image data 700 is write-protected and/or is preferably signed with the electronic signature of the registering authority. Together with the image data, the individual's ID or other authentication data may be sent to the authority's wireless communications module 200.

In step S2, the image data 700 is received at the wireless communications module 200 and relayed to the electronic circuit 300. Relaying the image data 700 may be conducted wirelessly or over fixed lines such a copper wiring or fibre optics.

In step S3, visual data 800 of the individual is captured by the image capture device 100 in the form of a raw digital image such as a raw CFA image and stored or cached in the memory of the image capture device. Subject to legal norms, the captured visual data 800 may be subject to some image pre-processing in the image capture device 100, such as corrections of artifacts in the acquired raw image induced by the image capture device's hardware, channel matching, linearity correction, dark correction, defect concealment, interline smear concealment, gain correction, optics corrections and/or stochastic noise reduction. However, some or all of these tasks may be delegated to the electronic circuit 300.

In step S4, the visual data 800 received and, where applicable, pre-processed by the image capture device is transmitted wirelessly or via a fixed line to the electronic circuit 300.

It should be noted that any of steps S0 to S2 relating to setting up the wireless data exchange between the wireless communications module 200 and the individual's mobile device 400 and to the transmission of the image data to the wireless communications module 200 may be executed concurrently with steps S3 and 4S which relate to the capture, pre-processing and relaying of the visual data 800 captured by the image capture device 100.

In step S5, the comparison 810 of the image data 700 with the visual data 800 is performed according to the foregoing description. For verifying that the individual 600 is indeed at the personal identity verification system, e.g. within a defined perimeter or area around the personal identity verification system, the electronic circuit 300 further determines the distance between the mobile communications device 400 carried by the individual and the wireless communications module 200 arranged at the identity verification site. For example, the electronic circuit 300 determines the distance based on transmission properties of an ultra-wideband transmission between the mobile communications device 400 and the wireless communications module 200 arranged at the identity verification site. The transmission properties used for determining the distance include a time difference, an amplitude difference, and/or a phase difference of the ultra-wideband transmission between the mobile communications device 400 and the wireless communications module 200. The ultra-wideband transmission used for determining the distance includes an ultra-wideband transmission between the mobile communications device 400 and the wireless communications module 200, e.g. an ultra-wideband transmission in step S1 for (requesting and) receiving the image data 700 or an ultra-wideband transmission in a separate requests/response transmission for determining the distance, e.g. during data exchange link step S0 or at another step and time prior to step S6.

In step S6, where the comparison yields a similarity within a predefined similarity tolerance and it was verified that the individual 600 is indeed at the personal identity verification system, i.e. when the distance between the mobile communications device 400 carried by the individual 600 and the wireless communications module 200 arranged at the identity verification site is smaller than a predefined value, positive verification information 500 is sent out from the electronic circuit 300 as an optical and or acoustic signal. Depending on the embodiment and/or so configuration, the predefined distance value indicates a defined perimeter or area around the personal identity verification system or the at least one wireless communications module arranged at the identity verification site. The positive verification information 500 may trigger the opening of a gate allowing the individual whose identity has been verified to pass through if said individual is not otherwise legally prevented from doing so. Instead of an automated gate, the positive verification information 500 may acoustically or optically signal personnel of the authority performing the identity verification to allow passage of the individual to or through to the desired area. In the case of negative verification information 500', the gate, if provided, is operated to remain closed or an acoustic or optical signal is emitted based on which the personnel of the authority performing the identity verification disallows passage of the individual. Alternatively or in addition, the positive or negative verification information is sent to the individual's mobile device 400 thereby informing the individual 600, by way of a visual and/or an acoustic positive or negative verification information signalled optically or acoustically by the individual's mobile device, of the status of the verification process.

FIG. 4 shows some components of the electronic circuit 300 shown in FIG. 1 for processing and comparing the image data received from the individual's mobile device and the visual data captured by the image capture device. The electronic circuit 300 comprises at least one microprocessor 301, at least one computer memory device such as a hard drive 302 and at least one i/o port 303, (input/output port), each of which are connected to a system bus 310 comprising a data bus 311, an address bus 312 and a control bus 313, each of these having functions are structures well known in the art. The electronic circuit 300 is configured to compare the image data received from the individual's mobile device with the visual data captured by the image capture device. For example, the microprocessor 301 is configured to execute a computer program, in particular an image processing program, to carry out the comparison and output its result. Suitable image processing computer programs may comprise distance functions, L1 or L2 metrics also known as Minkowski metrics and/or statistical classifiers and provide a measure of similarity of the image data and the visual data. The image data, the visual data and the result of their comparison are stored, retrieved and/or modified in the computer memory device 302. The image processing computer program preferably is also stored in the computer memory device 302.

The system bus 310 is preferably configured to communicatively connect the microprocessor 301, the at least one computer memory device 302, the image capture device and the authority's wireless communications module to each other. Preferably, the input port 303 is configured for inputting wireless signals received at the authority's wireless communications module from the individual's mobile device and/or for receiving (inputting) the visual data captured by the image capture device. For example, an output port 303 of the electronic circuit 300 may be connected to an input port of the wireless communications module. The same output port 303 or another output port of the electronic circuit 300 may be connected to an input port of the image capture device. Similarly, an input port 303 of the electronic circuit 300 may be connected to an output of the wireless communications module. The same input 303 or another input port of the electronic circuit 300 may be connected to an output of the image capture device. Further, an output port 303 may be connected to an automatic gate at the identity verification, if provided, for providing an open or close signal depending on the result of the image data/visual data comparison. Further, an input port 303 may be connected to the automatic gate for receiving status information of the gate, i.e. whether it is opened or closed.

The electronic circuit 300 may comprise a computer, in particular a computer server or workstation of a LAN (Local Area Network) or WLAN (Wireless Local Area Network), whereby the nodes of the LAN or WLAN include the at least one image capture device and the supplementary sensor for determining an individual's height, if provided.

In a variant, the electronic circuit 300 is configured to determine the strength of the wireless signal received from the individual's mobile device 400, wherein the electronic circuit is configured to compare image data contained in the strongest wireless signal with the visual data captured of the individual.

Figure 5:
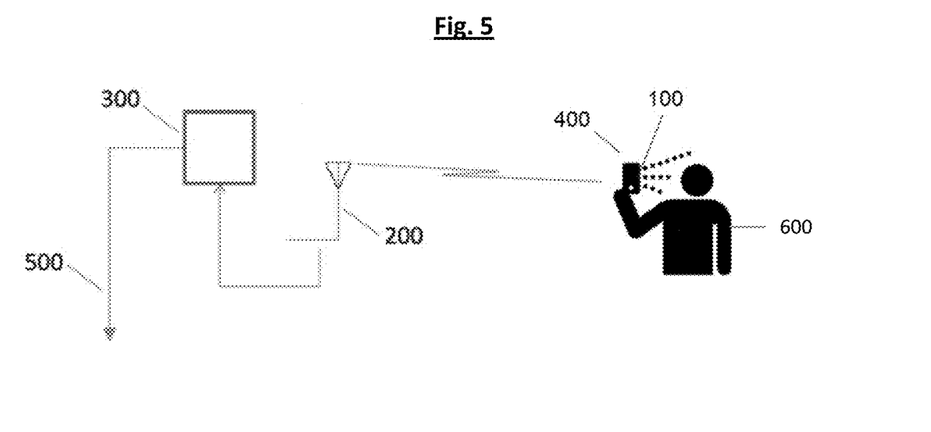
FIG. 5 is a schematic representation of the personal identity verification system as realized at an identity verification site, wherein an image capture device is carried by the individual.

FIG. 5 depicts the system according to FIG. 1 the description of which is herewith incorporated by reference whereby the aspect relating to the image capture device 100 shown in FIG. 1 is omitted and replaced by an image capture device 100 shown in FIG. 5 taking the form of a camera 100 integrated into the individual's mobile device 400. Instead of an image capture device arranged at the authority's side, the image capture device 100 of the individual's mobile device 400 is operated by the individual 600 or another person on behalf of the individual to capture visual data of an area of the individual's body such as the face. The visual data is captured by the image capture device 100 of the individual's mobile device 400 during the verification process. To ensure that the visual data is indeed captured by the image capture device 100 during the verification process (as opposed to stored, before in the mobile device 400), included in the visual data is a time stamp and/or verifiable picture content of the surroundings of the personal identity verification system or varying picture content generated and displayed by the personal identity verification system. The time stamp and/or verifiable picture content included in the visual data enables the personal identity verification system or its electronic circuit 300, respectively, to check and verify that the visual data was indeed captured during the verification process.

Figure 6:
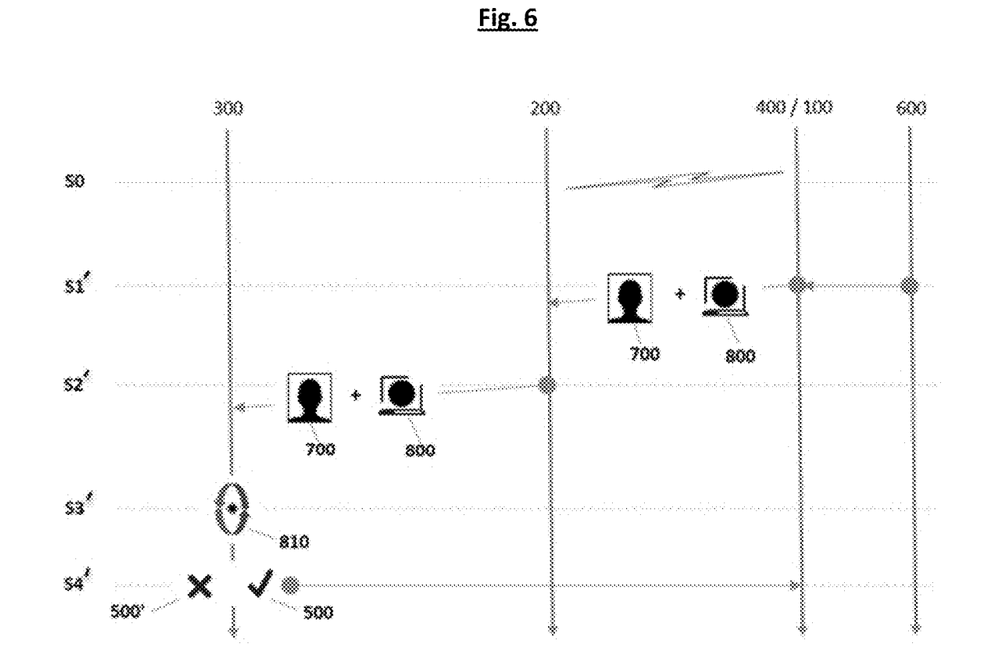
FIG. 6 shows a series of steps performed in embodiments of the identity verification system wherein visual data of an area of the individual's body is captured by an image capture device operated by the individual.

The method steps depicted in FIG. 6 correspond to those shown in FIG. 3, the description of which is herewith incorporated by reference with the omission of the method steps S3 and S4 of FIG. 6 relating to operation of the image capture device by the official identity verification authority. As shown in FIG. 6, step S1' shows the capture of visual data in the form of a selfie 800 by the individual, which is transmitted together, before or after the image data 700 to the authority's wireless communications module 200. Instead of a "selfie", the visual data of the individual 600 may be captured by having another person take a picture of the individual 600 on behalf of the latter. In step S2', the visual data and image data are relayed to the electronic circuit 300 where they are compared to one another in step S3' (corresponding to step S5 in FIG. 3). In step S4', corresponding to step S6 in FIG. 3, verification information 500, 500' is output. Alternatively or in addition, the positive or negative verification information is sent to the individual's mobile device 400 thereby informing the individual 600, by way of a visual and/or an acoustic signal provided by the individual's mobile device, of the status of the verification process.

LIST OF SYMBOLS 100 image capture device
200 wireless communications module
300 electronic circuit
301 microprocessor
302 memory
303 I/O
310 system bus
311 data bus
312 address bus
313 control bus
400 individual's mobile device
500 positive verification information
500' negative verification information
600 individual subject to security check
700 image data
800 visual data
810 image data/visual data comparison
900 shield enclosure
S0 data exchange link step
S1 image data transmission step
S2 image data relaying step
S3 visual data capture step
S4 captured visual data relaying step
S5 image data/visual data comparison step
S6 verification information output step
S1' image data transmission and visual data capture and transmission step
S2' visual data and image data relaying step
S3' image data/visual data comparison step
S4' verification information output step

The invention claimed is:

1. A Personal Identity Verification System for verifying the identity of an individual carrying a wireless mobile communications device, at an identity verification site, comprising:
   image data of an area of the individual's body, said image data being stored in the wireless mobile communications device carried by the individual at the identity verification site,
   at least one image capture device configured to capture visual data of an area of the individual's body while the individual is at the identity verification site,
   at least one wireless communications module arranged at the identity verification site configured to receive the image data from the wireless mobile communications device while the individual is at the identity verification site,
   an electronic circuit, connected to the at least one wireless communications module and to the at least one image capture device, arranged at the identity verification site, configured
   to determine a distance between the mobile communications device carried by the individual and the at least one wireless communications module arranged at the identity verification site,
   to compare the image data with the visual data, and
   to generate positive verification information when the image data and the visual data are established to be similar within a similarity-tolerance and the distance between the mobile communications device carried by the individual and the at least one wireless communications module arranged at the identity verification site is smaller than a predefined value.

2. The system according to claim 1, wherein the at least one wireless communications module arranged at the identity verification site comprises an ultra-wideband communications module, and the electronic circuit is configured to determine the distance between the mobile communications device carried by the individual and the at least one wireless communications module arranged at the identity verification site based on transmission properties of an ultra-wideband transmission between the mobile communications device carried by the individual and the at least one wireless communications module arranged at the identity verification site.

3. The system according to claim 2, wherein the electronic circuit is configured to determine the distance between the mobile communications device carried by the individual and the at least one wireless communications module arranged at the identity verification site using transmission properties including at least one of: a time difference, an amplitude difference, or a phase difference of the ultra-wideband transmission.

4. The system according to claim 1, wherein the electronic circuit is configured to compare the distance between the mobile communications device carried by the individual and the at least one wireless communications module arranged at the identity verification site to the predefined value indicative of a defined perimeter or area around the at least one wireless communications module arranged at the identity verification site.

5. The system according to claim 1, wherein the at least one wireless communications module arranged at the identity verification site comprises an ultra-wideband communications module configured to receive the image data from the wireless mobile communications device via ultra-wideband transmission.

6. The system according to claim 1, wherein the at least one image capture device is mounted at the personal identity verification system.

7. The system according to claim 1, wherein the at least one image capture device is a part of the wireless mobile communications device carried by the individual.

8. The system according to claim 1, wherein the wireless mobile communications device carried by the individual is one out of the group: pocket Wi-Fi, mobile telephone, smartphone, satellite phone, smartwatch, wearable, tablet PC or laptop computer.

9. The system according to claim 1, wherein the at least one wireless communications module and the wireless mobile communications device carried by the individual are configured to exchange wireless data based on a wireless data exchange protocol standard including at least one of: ultra-wideband communication, Wi-Fi, WirelessHD, WiGig, Bluetooth, Bluetooth 4.0 or BLE, NFC.

10. The system according to claim 1, wherein the electronic circuit is configured to generate negative verification information when a similarity between the image data and the image data is not established within said similarity-tolerance.

11. The system according to claim 1, comprising a gate communicatively connected to the electronic circuit, wherein the gate is configured to open and let the individual through if the electronic circuit generates positive verification information.

12. The system according to claim 1, wherein the image capture device is a trusted image capture device operable after unlocking with a security password, a swipe pattern, an electronic signature and/or a fingerprint scan.

13. A method for verifying the identity of an individual carrying a wireless mobile communications device, at an identity verification site, comprising:
   capturing visual data of an area of the individual's body, at the identity verification site, with at least one image capture device configured to capture visual data of an area of the individual's body, while the individual is at the identity verification site,
   while the individual is at the identity verification site, receiving in an electronic circuit arranged at the identity verification site, from the wireless mobile communications device via a wireless communications module arranged at the identity verification site, image data of an area of the individual's body, said image data being stored in the wireless mobile communications device carried by the individual at the identity verification site,
   determining, in the electronic circuit, a distance between the mobile communications device carried by the individual and the at least one wireless communications module arranged at the identity verification site,
   comparing, in the electronic circuit, the image data with the visual data, and
   generating, in the electronic circuit, positive verification information when the image data and the visual data are similar within a similarity-tolerance and the distance between the mobile communications device carried by the individual and the at least one wireless communications module arranged at the identity verification site is smaller than a predefined value.

14. The method according to claim 13, wherein the electronic circuit determines the distance between the mobile communications device carried by the individual and the at least one wireless communications module arranged at the identity verification site based on transmission properties of an ultra-wideband transmission between the mobile communications device carried by the individual and the at least one wireless communications module arranged at the identity verification site.

15. The method according to claim 14, wherein the electronic circuit determines the distance between the mobile communications device carried by the individual and the at least one wireless communications module arranged at the identity verification site using transmission properties including at least one of: a time difference, an amplitude difference, or a phase difference of the ultra-wideband transmission.

16. The method according to claim 13, wherein the electronic circuit is configured to compare the distance between the mobile communications device carried by the individual and the at least one wireless communications module arranged at the identity verification site to the predefined value indicative of a defined perimeter or area around the at least one wireless communications module arranged at the identity verification site.

17. The method according to claim 13, wherein the at least one wireless communications module arranged at the identity verification site receives the image data from the wireless mobile communications device via ultra-wideband transmission.

18. The method according to claim 13, further comprising transmitting the image data from the wireless mobile communications device via a wireless data exchange protocol chosen out of the group: ultra-wideband communication, Wi-Fi, WirelessHD, WiGig, Bluetooth, Bluetooth 4.0, BLE, or NFC.

19. The method according to claim 13, wherein capturing the visual data of an area of the individual's body is carried out with the use of an image capturing device mounted at the personal identity verification system.

20. The method according to claim 13, wherein capturing the visual data of an area of the individual's body is carried out with the use of a camera integrated into the individual's mobile device.

* * * * *